INVENTORS
HAROLD A. YOUKERS
& JOHN LUSH

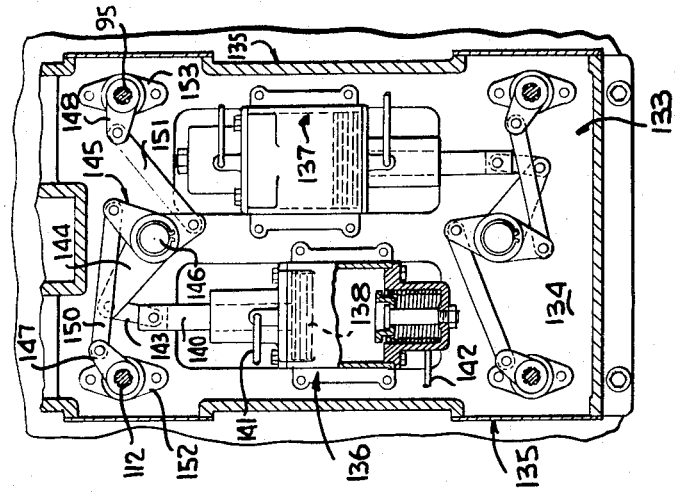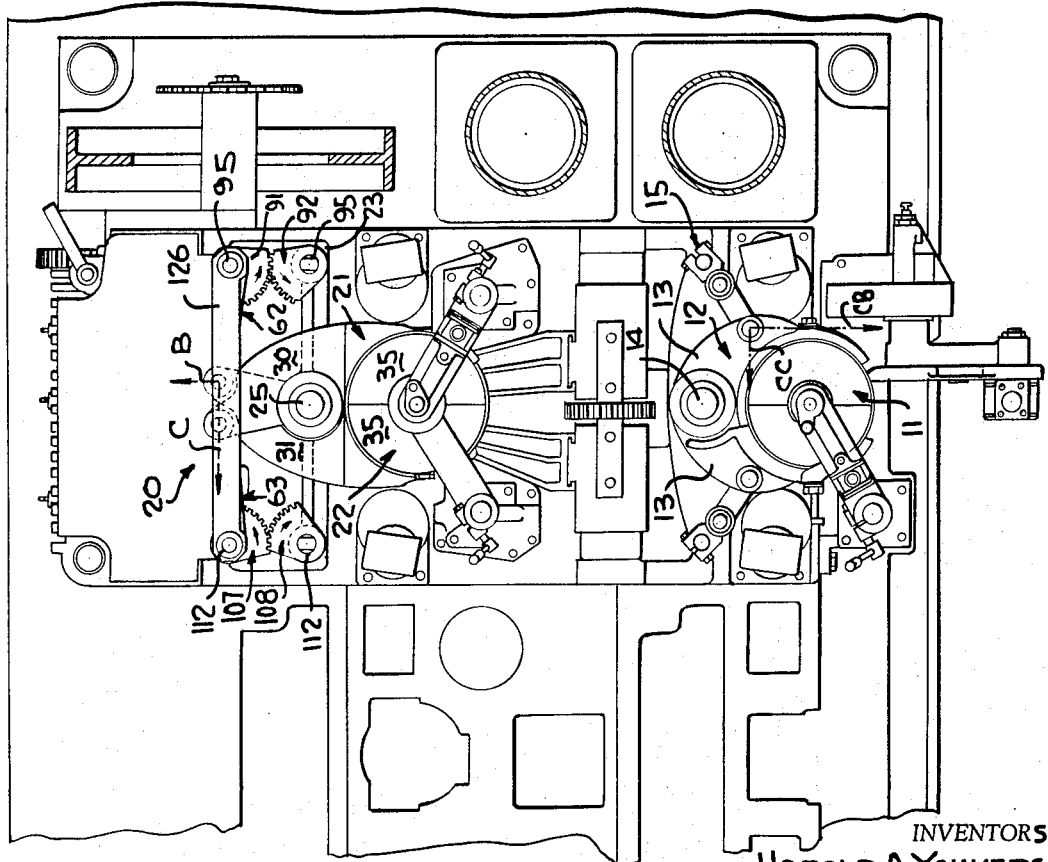

Dec. 12, 1967  H. A. YOUKERS ET AL  3,357,811
MOLD HOLDER ACTUATING MECHANISM
Filed Nov. 12, 1963  4 Sheets-Sheet 3
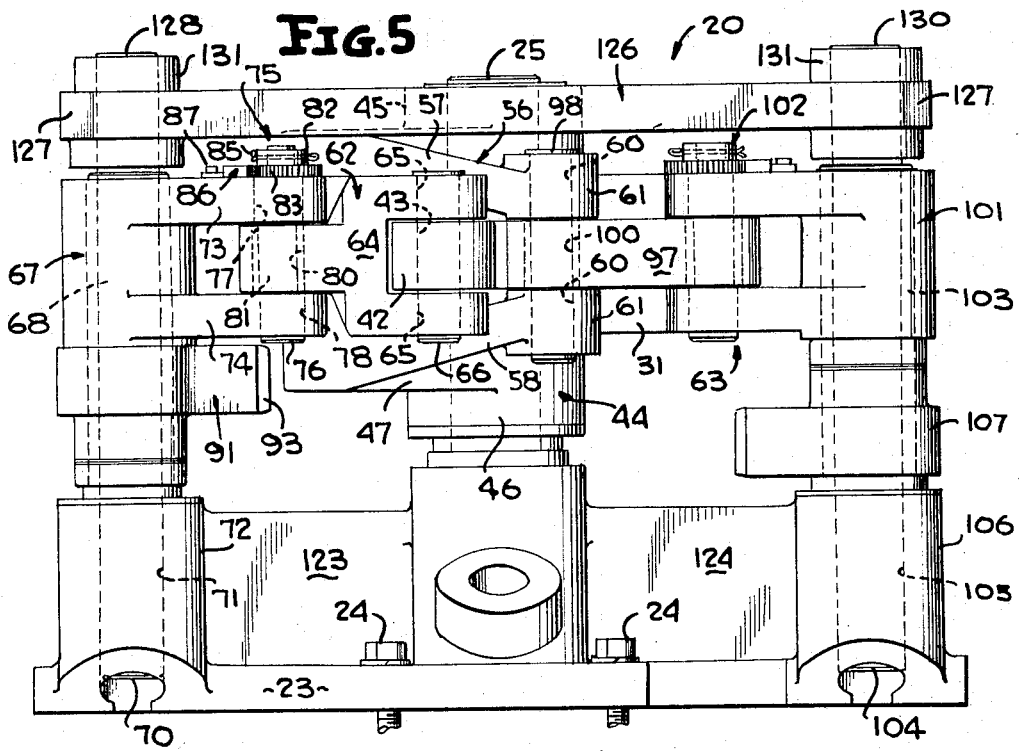
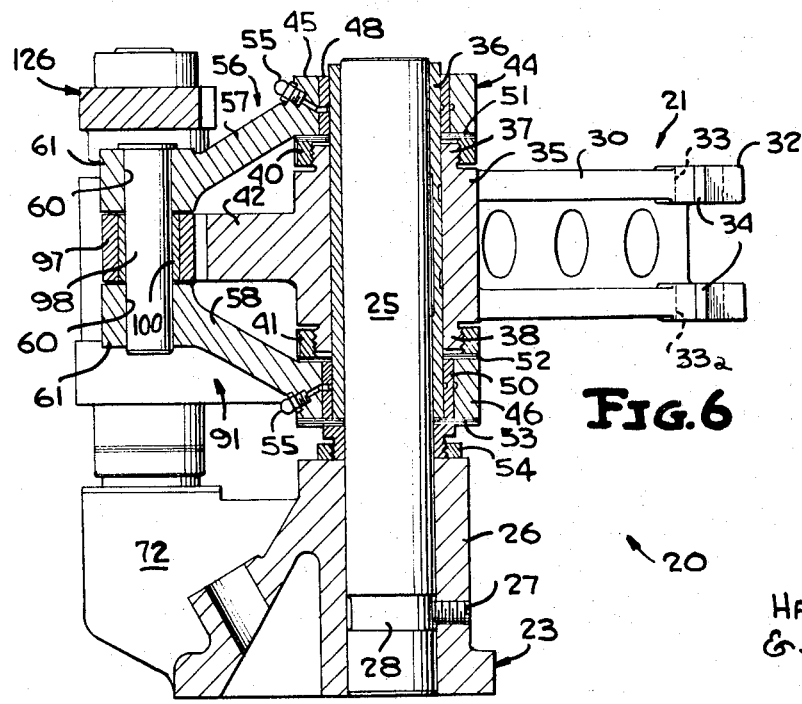
INVENTORS
HAROLD A. YOUKERS
& JOHN LUSH
BY
*Mason, Porter, Diller & Stewart*
ATTORNEYS

INVENTORS
HAROLD A. YOUKERS
& JOHN LUSH

United States Patent Office 3,357,811
Patented Dec. 12, 1967

3,357,811
MOLD HOLDER ACTUATING MECHANISM
Harold A. Youkers, Wheeling, W. Va., and John Lush, Summit, Ill., assignors, by mesne assignments, to Brockway Glass Company, Inc., Brockway, Pa., a corporation of New York
Filed Nov. 12, 1963, Ser. No. 322,633
15 Claims. (Cl. 65—323)

This invention relates to novel apparatus for actuating mold holders of glass forming machines under higher closing forces than are presently attained in conventional mold holder actuating mechanisms and at the same time precluding the high deflection forces present in such conventional mechanisms.

The novel apparatus of this invention is particularly adapted for opening and closing the "blank" or "parison" molds on a Hartford Empire I.S. glass forming machine, such as is disclosed in U.S. Patent 1,911,119 issued to Henry W. Ingle, granted on May 23, 1933.

A glass forming machine of the type disclosed in the above-noted patent generally includes a "blank" or "parison" mold carrying an "open end-down" form at a "blank" side of the machine and a "blow" mold carrying an "open end-up" form at a "blow" side of the machine. A conventional neck-ring transfer mechanism is arranged to transfer a blank or parison from the blank mold on the blank side of the machine to the blow mold on the blow side of the machine in an open-end-up position.

The blank and blow molds are substantially identical and both comprise two mold halves or sections pivotally journalled by a mold holder to a mold holder shaft. Each of the mold holders has an aperture for connecting each mold holder to a conventional mold holder actuating mechanism.

The conventional mold holder actuating mechanism opens and closes the blank and blow molds through a fluid operated linkage assembly. Since substantially identical actuating mechanisms are associated with each of the blank and blow molds, only the mechanism associated with the blank side of the machine will be considered hereafter.

The conventional mold holder actuating mechanism on the blank side of the glass forming machine comprises a fluid cylinder provided with a reciprocal piston having a rod connected by a pivoted link to a first arm of a three-armed rocking beam linkage. The other two arms of the rocking beam linkage are each connected by a respective link to each of a pair of crank shafts arranged on either side of the blank mold. Each crank shaft at an end portion thereof opposite its connection with the rocking beam linkage is connected by a crank and suitable links to each of the mold sections of the blank mold.

The blank mold is opened by reciprocating the piston rod outwardly of the fluid cylinder in a conventional manner, causing rotation of the crank shafts, which in turn, impart this rotation through the linkage assemblies to each half of the blank mold, thereby causing pivoting of the mold holders about the axis of the mold holder shaft. When the piston is reciprocated into the cylinder, the rocking beam linkage reverses the rotation of the crank shafts causing reverse pivoting of the mold holders about the axis of the mold holder shaft and thereby effects closing of the blank mold.

During the closing of the blank mold, as well as the blow mold, the mold holder shaft upon which the mold holder of the blank mold is pivoted is deflected appreciably by a "forward" or "bending" force component (calculated by theoretical stress analysis methods to be about 1110 lbs. on each mold half at a fluid pressure supply of 30 p.s.i.g.) because of the direction of force application combined with the inherent toggle action characteristics of the linkages of the conventional mold holder actuating mechanism. Manufacturing tolerances and wear in the linkages tending to cause certain links thereof to approach "dead center" further increase the bending force component during the closing cycle of the forming machine. At the same time, i.e., during the closing cycle, the "closing" component of force is calculated at approximately 750 lbs. on each half of the blank mold. Thus, the mold holder shaft is deflected by a forward force component which is substantially one and one-half times greater than the closing force component.

It is to be understood that these theoretical example calculated force components are not exact and do not take into consideration such factors as wear, heat, surface finish and hardness, tolerances, lubrication, dirt, friction etc. that would modify the values to a certain extent with respect to individual machines. Therefore, actually measured force components on a particular machine might vary considerably therefrom.

These conventionally low closing force components and high bending force components are undesirable in the glass manufacturing industry for various reasons. A primary reason is that during the conventional "press" cycle of a glass forming operation, a tapered press plunger is forced into a molten glass charge in the blank mold (comparable to forcing a wedge into the molten glass). It is at this time that critical forces are developed which tend to open the mold halves against the closing force components of the forming machine. Thus, the greater the closing force components, the lesser is the tendency of the mold halves or sections of the blank mold to move toward an opened position with the resultant elimination of such defects in the glassware as mold seam flash.

It is also desirable to hold the forward or bending force components tending to deflect the mold holder shaft at a minimum to prevent mold to neck-ring misalignment which causes "checks" (minute fractures) in the critical "finish" area of the glassware. A present trend in the glassware manufacturing industry is toward "double gob" operations, i.e., the simultaneous formation of two glassware items. It is therefore now doubly important to provide sufficient mold closing forces and at the same time, reduce to a minimum the bending forces tending to deflect the mold holder shaft.

It is therefore an object of this invention to provide a novel mold holder actuating mechanism which eliminates the above-noted deficiencies inherent in prior art mold holder actuating mechanism while at the same time appreciably increasing the closing force components and minimizing the bending force components as compared to the forces presently encountered in conventional mold holder actuating mechanisms.

Still another object of this invention is to provide a novel holder actuating mechanism which eliminates deficiencies inherent in conventional mold holder actuating mechanisms, and in addition, to provide a mold holder actuating mechanism which can be substituted for conventional actuating mechanisms of glass forming machines without special adaptation components and without necessitating the re-designing of the type of glass forming machine above-mentioned.

A further object of this invention is to provide a novel mold holder actuating mechanism comprising a base, a pair of mold holder arms each pivotally journalled to a common shaft carried by the base, each of the arms constituting a lever of the first class with the common shaft acting as a fulcrum, each arm having an end portion connected to a respective one of a pair of toggle linkage assemblies, each toggle linkage assembly including means for adjusting the toggle linkage assemblies to prevent the same from reaching dead center.

A further object of this invention is to provide a novel mold holder actuating mechanism comprising a base, a pair of mold holder arms each pivotally journalled to a common shaft carried by the base, each of the arms constituting a first cass lever, an end portion of each arm having an ear connected to a respective one of a pair of toggle linkage assemblies, a crank arm coupled to each of the toggle linkage assemblies for imparting movement through the toggle linkage assemblies to the mold holder arms, and means carried by the base for coupling the movement imparting means to a mold operating shaft of a conventional glass forming machine.

Still another object of this invention is to provide a novel mold holder actuating mechanism of the type above-described, and in addition, to provide means for axially adjusting the mold holder arms with respect to each other.

A further object of this invention is to provide a novel mold holder actuating mechanism of the type immediately above described wherein the axially adjusting means includes an adjusting ring surrounding the mold holder shaft and threadably connected to an annular threaded end portion of a journal of one of the mold holder arms for movement toward and away from an annular surface of the other of the pair of mold holder arms.

A further object of this invention is to provide a novel mold holder actuating mechanism constructed in accordance with the above objects in which the means for adjusting the toggle linkage assemblies to prevent the same from reaching dead center is an eccentric pin and lock mechanism arranged between a pair of links of each of the toggle linkage assemblies.

A further object of this invention is to provide a novel mold holder actuating mechanism of the type above described in which the means for adjusting each of the toggle linkage assemblies to prevent the same from reaching a dead center position is a turnbuckle associated with each of the toggle linkage assemblies and forming one of the links thereof.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a fragmentary top perspective view of a conventional glass forming machine, and illustrates a novel mold holder actuating mechanism of this invention mounted on the blank side of the forming machine.

FIGURE 2 is a fragmentary sectional view taken through the blank side of the glass forming machine of FIGURE 1, and illustrates a conventional mold operating cylinder for actuating a pair of mold operating shafts through a rocking beam to open and close the mold holder actuating mechanism of FIGURE 1.

FIGURE 5 is an elevational view of the mold holder actuating mechanism taken along line 5—5 of FIGURE 3, and illustrates an adjusting mechanism cooperating with each of a pair of toggle linkage assemblies to prevent the toggle linkage assemblies from reaching a dead center position.

FIGURE 6 is a vertical sectional view taken along line 6—6 of FIGURE 3, and illustrates the specific manner in which the mold holder arms are pivotally journalled to a mold holder shaft, and a mechanism for axially adjusting the mold holder arms relative to each other.

Figure 3:
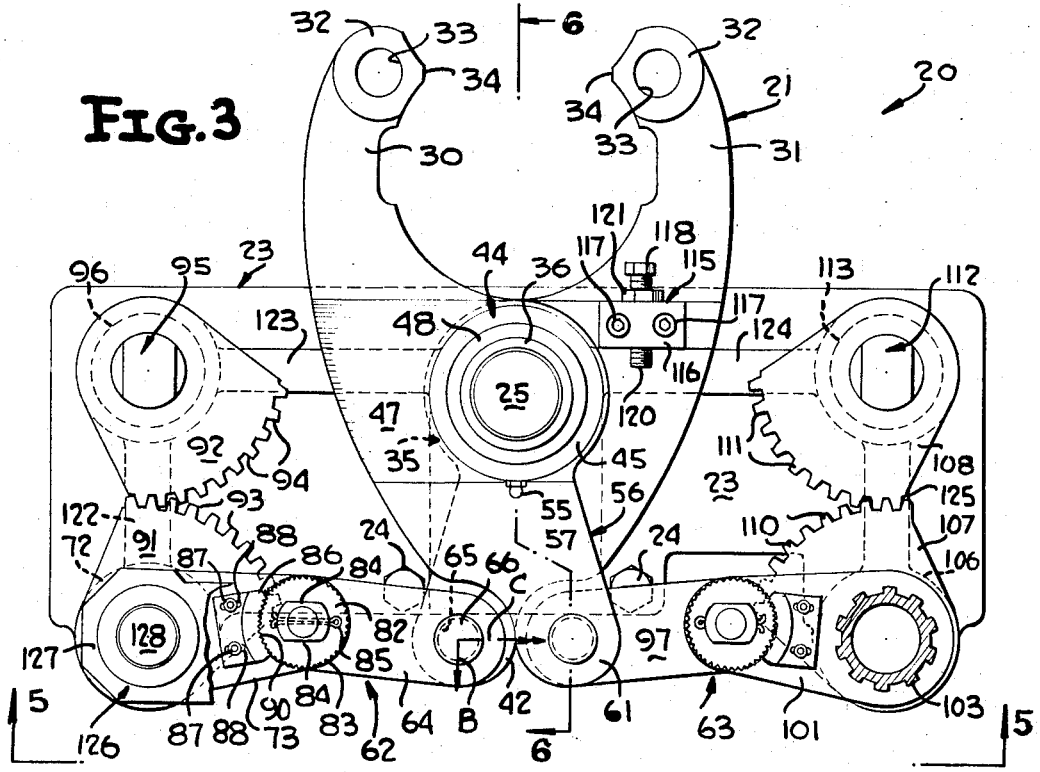
FIGURE 3 is a top plan view of a mold holder actuating mechanism, with certain parts thereof removed for clarity and illustrates the various components of the actuating mechanism in their relative positions when the mold holder is in a closed position.

A conventional glass forming machine is shown in FIGURE 1, and is generally designated by the reference numeral 10. The glass forming machine 10 includes a conventional blow mold 11 supported by a conventional mold holder 12 having a pair of identical arms 13 each pivotally journalled to a mold holder shaft 14. A conventional mold holder actuating mechanism 15 is connected to the mold holder 12 in a manner clearly described in the above-noted patent for opening and closing the mold 11.

The blow mold 11, conventional mold holder 12 and conventional mold holder actuating mechanism 15 form no part of this invention but are illustrated merely to show the environmental relationship between these conventional components and a novel holder actuating mechanism 20 mounted on the blank side of the glass forming machine 10.

The mold holder actuating mechanism 20 includes a mold holder 21 which supports a conventional blank mold 22.

The mold holder actuating mechanism 20 of FIGURE 1 is best illustrated in FIGURES 3 through 6 of the drawings and includes a metallic base 23 suitably apertured to receive a plurality of bolts 24 for securing the mold holder actuating mechanism 20 to the glass forming machine 10 of FIGURE 1. A mold holder shaft 25 (see FIGURE 6) is secured in an integral journal 26 of the base 23 by a set screw 27 bottoming in an annular groove 28 of the shaft 25. The mold holder shaft 25 pivotally supports the mold holder 21 in a manner to be described immediately hereafter.

The mold holder 21 includes a pair of arms 30, 31 each having an identical first end portion 32. Each of the end portions 32 of the arms 30 and 31 is bifurcated (see FIGURE 6) and has a pair of identical, vertically aligned apertures 33 and vertically aligned ribs 34. The apertures 33 and ribs 34 are adapted for detachably securing each half or section 35 of the blank mold 22 (see FIGURE 1) to an associated one of the pair of mold holder arms 30, 31 in a conventional manner.

The arm 31 is pivotally secured to the mold holder shaft 25 by a central journal 35 in a manner clearly illustrated in FIGURE 6 of the drawings. An annular bushing 36 is interposed between the mold holder shaft 25 and the journal 35 of the arm 31. An upwardly directed, threaded, annular portion 37 of the journal 35 and a similar downwardly directed, threaded, annular portion 38 of the journal 35 each carries an identical adjusting ring or collar 40 and 41 respectively. The adjusting rings 40 and 41 function in a manner to be described more fully hereafter for adjusting the axial relationship of the arms 30 and 31 for purposes of alignment.

An integral ear 42 is integral with and projects rearwardly from the journal 35 of the arm 31. A vertical pin receiving opening 43 is formed in the ear 42 of the arm 31 for a purpose to be described more fully hereafter.

The arm 30 of the mold holder 21 is similarly pivotally secured to the mold holder shaft 25 by a journal 44. The journal 44 includes an upper annular journal portion 45 (see FIGURES 5 and 6) integrally joined to a lower annular journal portion 46 by a radially, outwardly projecting portion 47 (see FIGURES 3 and 5). An annular bushing 48 is interposed between the upper journal portion 45 of the journal 44 and the annular bushing 36 while an identical annular bushing 50 is interposed between the lower journal portion 46 and the annular bushing 36.

A thrust washer 51 is positioned between the ring 40 and the upper journalled portion 45 of the journal 44. A similar thrust washer 52 is positioned between the ring 41 and the lower journal portion 46 of the journal 44. A lowermost thrust washer 53 surrounds the mold holder shaft 25 beneath the lower journal portion 46 of the journal 44. A two-part threaded adjusting collar 54 is positioned between the thrust washer 53 and an upper portion of the mold holder journal 26 of the base 23 for height adjustment.

An identical lubricating fitting 55 is threadably received in an aperture (unnumbered) in each of the journals 45 and 46 of the journal 44 for lubricating the various pivoting members.

The mold holder arm 30 terminates in a rearwardly directed ear 56 comprising an upper downwardly converging portion 57 and a lower upwardly converging portion 58. An identical pin receiving opening 60, 60 is formed in an identical enlarged portion 61 of each of the converging portions 57 and 58 of the ear 56 (see FIGURE 5) for a reason to be described more clearly hereafter.

The mold holder arms 30 and 31 thus each constitute a lever of the first class with the mold holder shaft 25 acting as a fulcrum. The mold holder arms 30 and 31 are adapted to be pivoted between the positions illustrated in FIGURES 3 and 4 of the drawings, the latter illustration being the fully opened position of the mold holder 21 while the former drawing illustrates the fully closed position of the mold holder 21. The mold holder arms 30 and 31 are pivoted between these two positions through a pair of toggle linkage assemblies 62 and 63 connected to the respective mold holder arms 31 and 30.

The toggle linkage assembly 62 comprises a bifurcated link 64 (FIGURE 5) having a pair of identical vertically aligned pin receiving openings 65, 65. A pin 66 passed through the pair of pin receiving openings 65, 65 of the link 64 and the pin receiving opening 43 of the ear 42 to connect the link 64 of the toggle linkage assembly 62 to the mold holder arm 31 of the mold holder 21.

A bifurcated link 67 (see FIGURE 5) of the toggle linkage assembly 62 is connected in a conventional manner to a splined portion 68 of a shaft 70 rotatably mounted in a vertical bore 71 of an integral upstanding journal 72 of the base 23. The link 67 forms a crank arm having identical upper and lower portions 73 and 74 respectively. The portions 73 and 74 of the link 67 are connected to the link 64 of the toggle linkage assembly 62 by an adjusting pin mechanism 75.

The adjusting pin mechanism 75 comprises a pin 76 received in pin receiving openings 77 and 78 in the respective portions 73 and 74 of the link 67 and in a bushed pin receiving bore 80 in the link 64. A central eccentric portion 81 of the pin 76 is received in the bushed bore 80 of the link 64. A collar 82 having a plurality of peripheral teeth 83 and flattened tool engaging surfaces 84 is secured to an upper portion of the pin 76 in a conventional manner by a cotter pin or key 85.

Figure 4:
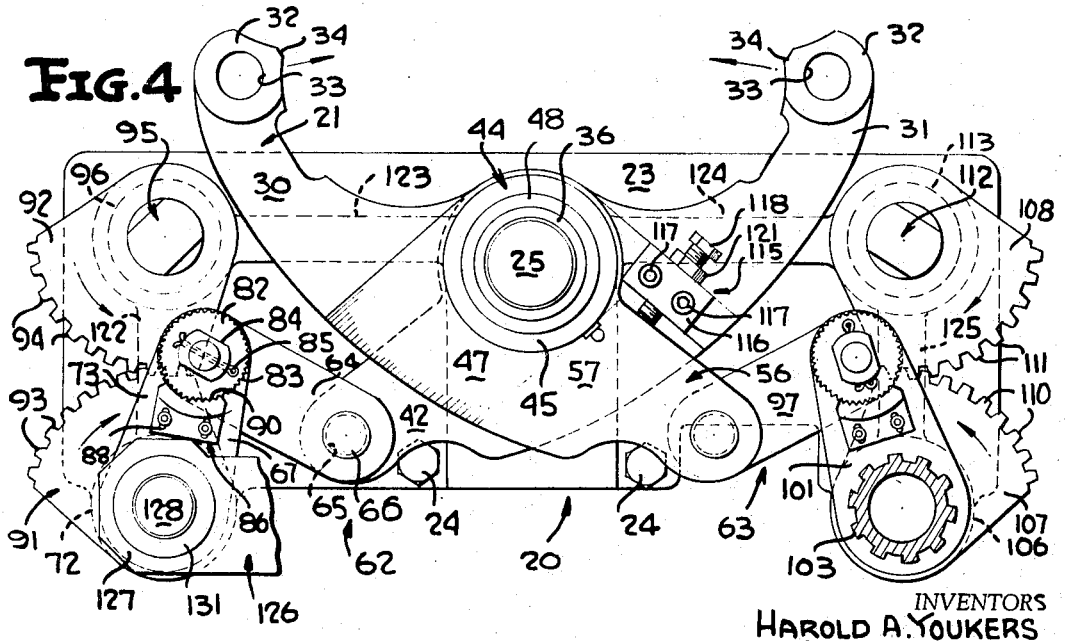
FIGURE 4 is a top plan view of the mold holder actuating mechanism of FIGURE 3, and illustrates the position of the various components of the actuating mechanism when the mold holder is in an open position.

A locking block 86 is adjustably secured atop the portion 73 of the link 67 by a pair of identical screws 87, 87 each passed through an identical elongated slot 88 of the locking block 86. A plurality of arcuately arranged teeth 90 of the locking block 86 are in mesh with the teeth 83 of the collar 82, as is best illustrated in FIGURES 3 and 4 of the drawings.

The purpose of the mechanism 75 is to adjust the link 64 with respect to the link 67 of the toggle linkage assembly 62 to prevent this toggle linkage assembly from reaching a "dead center" position. The mechanism 75 is operated to adjust the links 64 and 67 by first unscrewing the screws 87, 87 securing the locking block 86 to the upper portion 73 of the link 67. A suitable tool is engaged upon the surfaces 84, 84 of the collar 82 and rotated to turn the pin 76. As the pin 76 is turned, the eccentric central portion 81 thereof bears against the surface defining the bushed bore 80 in the link 64 to shift this link with respect to the link 67 in an obvious manner. When the links 64 and 67 have been thus adjusting, the locking block 86 is positioned with the teeth 90 in mesh with the teeth 83 of the collar 82 and the screws 87, 87 are tightened.

Movement is imparted to the toggle linkage assembly 62 by means of a pair of crank arms 91 and 92. The crank arm 91 is secured to the splined portion 68 of the shaft 70 between the link 67 and the journal 72 of the base 23 (see FIGURE 5). The crank arm 91 has a plurality of arcuately arranged teeth 93 in mesh with a similar plurality of arcuately arranged teeth 94 of the crank arm 92, as is best illustrated in FIGURES 3 and 4 of the drawings. The crank arm 92 is secured in a conventional manner to a mold operating shaft 95 rotatably mounted in an integral apertured journal 96 of the base 23. As the mold operating shaft 95 is rotated in a manner to be described more fully hereafter, the motion thereof is imparted through the crank arm 92 to the crank arm 91 and the toggle linkage assembly 62 to pivot the mold holder arm 31 of the mold holder 21 in either a clockwise or counterclockwise direction as viewed in FIGURES 3 and 4 of the drawings.

The toggle linkage assembly 63 is substantially identical to the toggle linkage assembly 62 and comprises a first link 97 secured to the ear 56 of the mold holder arm 30 by a vertical pin 98 (FIGURE 5) received through the vertical pin receiving openings 60, 60 and a vertically aligned pin receiving bore 100 in a hardened bushing in the link 97.

The link 97 is pivotally and adjustably secured to a second link 101 by an adjusting pin mechanism 102. The link 101 and the mechanism 102 are identical to the respective link 67 and the adjusting pin mechanism 75, and a further description of these latter two elements is considered unnecessary for a complete understanding of this invention.

The link 101 is secured to a splined portion 103 of a vertical shaft 104 received in a vertical bore 105 of a journal 106 of the base 23.

The toggle linkage assembly 63 is actuated by a pair of crank arms 107 and 108. The crank arm 107 is keyed to the central splined portion 103 of the shaft 104 in a manner clearly illustrated in FIGURE 3 of the drawings. The crank arm 107 includes a plurality of arcuately arranged teeth 110 in mesh with a similar plurality of arcuately arranged teeth 111 of the crank arm 108.

The crank arm 108 is keyed in a conventional manner to a second mold operating shaft 112 of a conventional mold glass forming machine which is rotatable in a manner to be described more fully hereafter. The mold operating shaft 112 is rotatably received in an upstanding integral journal 113 of the base 23.

When the mold operating shaft 112 is actuated in a manner to be described more fully hereafter, the crank arm 108 rotates the crank arm 107, and the mold holder arm 30 of the mold holder 21 is pivoted about the mold holder shaft 25 through the toggle linkage assembly 63 between the positions illustrated in FIGURES 3 and 4 of the drawings.

An adjustable stop mechanism 115 (see FIGURES 3 and 4) is carried by the mold holder arm 31 and cooperates with the ear 56 of the mold holder arm 30 to limit the position of maximum opening of the mold holder 21. The stop mechanism 115 includes an upstanding block 116 secured to the mold holder arm 31 by a pair of identical screws 117, 117. A bolt 118 having an end portion 120 is threadably received in a threaded aperture (unnumbered) in the member 116. A nut 121 secures the bolt 118 in any preselected position thereof.

As the mold holder arm 31 pivots in a clockwise direction (as viewed in FIGURE 3) and the mold holder arm 30 pivots in a counterclockwise direction (as viewed in the same figure) the end portion 120 abuts the upper, downwardly converging portion 57 of the ear 56 to prevent further pivoting movement of the mold holder arms 30, 31, as is best illustrated in FIGURE 4 of the drawings.

Since the mold holder actuating mechanism 20 is subjected to high opening and closing forces, the base 23 thereof is reinforced by a plurality of integral, upstanding reinforcing ribs 122 through 125. A reinforcing bar 126 (see FIGURE 5) is connected between the shafts 70 and 104 to further rigidify and reinforce the mold holder actuating mechanism 20. The bar 126 includes a pair of opposed, identical, apertured end portions 127, 127 receiving an associated upper end portion 128 and 130 of the respective shafts 70 and 104. An identical conventional retainer 131 secures the opposite end portions 127 of the bar 126 to the end portions 128 and 130 of the shafts 70 and 104 respectively.

The mold holder actuating mechanism 20 of FIGURES 3 through 6 of the drawings is secured to the glass forming machine 10 in the position illustrated in FIGURE 1 by the plurality of anchor bolts 24. The anchor bolts 24 are received in conventional mounting holes (unnumbered) in the blank side of the glass forming machine 10. Directly beneath the portion of the glass forming machine 10 to which the mold holder actuating device 20 is attached is located an area 133 (see FIGURE 2). The area 133 is partially defined by a base mounting plate 134 and upstanding housing portions 135 of the forming machine 10. A pair of identical fluid cylinders 136 and 137, each of a conventional construction, are secured to the mounting plate 134 in a conventional manner. Only the fluid cylinder 136 and its operation will be described hereafter.

The fluid cylinder 136 and its associated linkages is identical to the complementary mechanisms disclosed in U.S. Patent 1,911,119, heretofore noted. The fluid cylinder 136 includes a piston 138 carrying a piston rod 140. Suitable fluid, such as air, is introduced into the fluid cylinder 136 through conduits 141 and 142 in a conventional manner to reciprocate the piston 138 and the rod 140 thereof.

The piston rod 140 is connected by a link 143 to an arm 144 of a three-arm rocking beam 145 journalled on a shaft 146. The other two arms (unnumbered) of the three-arm rocking beam 145 are each connected to an associated crank arm 147 and 148 by respective links 150 and 151. The crank arm 147 is splined to the mold operating shaft 112 which is in turn rotatably journalled in a bracket 152 secured to the mounting plate 134 in a conventional manner. The crank arm 148 is similarly splined to the mold operating shaft 95 and a lower portion (unnumbered) of this shaft 95 is similarly rotatably journalled in a bracket 153 conventionally secured to the mounting plate 134.

The various components shown in FIGURE 2 of the drawings are illustrated in the "closing" position of the mold holder actuating mechanism 20 when the mold holder arms 30 and 31 are applying closing pressure to the mold sections 35, 35 of the mold 22. In this closed position of the mold holder 21, the piston rod 140 is reciprocated outwardly of the fluid cylinder 136 by air introduced therein through the conduit 142, from a conventional air supply under a pressure of 30 p.s.i.g. The three-arm rocking beam 145 rotates in a clockwise direction as viewed in FIGURE 2 to the fully rotated position illustrated in the same figure. This clockwise rotation of the three-arm rocking beam 145 rotates the mold operating shaft 112 in a clockwise direction through the crank arm 147 and the link 150 while the mold operating shaft 95 is rotated in a counterclockwise direction by the crank arm 148 and the link 151. This rotation of the mold operating shafts 112 and 95 is imparted to the respective crank arms 108 and 92 to pivot these arms from the position illustrated in FIGURE 4 to the closed position shown in FIGURE 3. The counterclockwise movement of the crank arm 92 imparts clockwise rotation to the crank arm 91, which through the toggle linkage assembly, pivots the mold holder arm 31 in a counterclockwise direction about the mold holder shaft 25 from the position shown in FIGURE 4 to the position shown in FIGURES 1 and 3. Similarly, clockwise rotation of the crank arm 108 imparts counterclockwise rotation to the crank arm 107 and, through the toggle linkage assembly 63, the mold holder arm 30 is rotated in a clockwise direction about the mold holder shaft 25 from the position shown in FIGURE 4 to the position illustrated in FIGURES 3 and 1 of the drawings.

During the closing cycle just described, high closing forces are encountered. For example, the conventional mold holder actuating mechanism 15 (FIGURE 1) is closed in an identical manner as that above-described except the fluid cylinder 137 (FIGURE 2) and the various linkages thereof effect closing of the conventional mold holder 12. Under a conventional fluid (air) supply of 30 p.s.i.g., a theoretical "closing" component of force, CC of 748 lbs. is produced on each half or section of the mold holder 12. A "bending" or "forward" force component CB of 1110 lbs. is also produced on each half of the mold holder 12 during the closing thereof. These force components are brought about as a result of the toggle action of the conventional linkages of the conventional mold holder actuating mechanism 15. The "bending" or "forward" force component causes the conventional mold holder shaft 14 to be deflected "forward" (in a direction of the arrow CB) during the closing part of the machine cycle.

It is desirable to minimize the deflection of the mold holder shaft 14 or 25 (FIGURE 1) for reasons heretofore noted, and the novel mold holder closing mechanism 20 of this invention so minimizes the deflection of the mold holder shaft 25 by achieving a "closing" component of force almost four times greater than the theoretical "closing" component of force of the conventional mold holder actuating mechanism 15. The theoretical "bending" or "forward" component of force of the mold holder actuating mechanism 20 is also approximately less than ¼ of the theoretical "bending" component of force of the conventional mold holder actuating mechanism 15. Under the same air supply conditions noted above, i.e., 30 p.s.i.g., the "closing" component of force C (FIGURES 1 and 3) produced on each half of the mold holder 21 is theoretically determined at about 2950 lbs. The "bending" or "forward" component of force B (FIGURES 1 and 3) on each half of the mold holder 21 is theoretically approximately 225 lbs., more than eleven times less than the "closing" component of force C.

One reason for the relatively higher "closing" component of force achieved by the novel mold holder actuating mechanism 20 of this invention is the positioning of the toggle linkage assemblies 62 and 63 on the side of the mold holder shaft 25 opposite the end portions 32, 32 of the mold holder arms 30 and 31 which exert the closing force on the mold sections 35, 35 of the mold 22. Secondly, the links of the toggle linkage assemblies 62 and 63 are positioned so that the direction of the "bending" components of force on each toggle linkage assembly counteract each other. This achieves a high "closing" force component and a negligible "bending" force component in a direction tending to deflect the mold holder shaft 25.

Further, the adjusting pin mechanisms 75 and 102 of the respective toggle linkage assemblies 62 and 63 permit take-up in these assemblies for initial set-up, wear, or manufacturing tolerances. The toggle angle of each of the toggle linkage assemblies 62 and 63 can thus be kept at an optimum without danger of the assemblies going to a "dead center" position.

During the opening cycle of the glass forming machine 10, air is introduced through the conduit 141 (FIGURE 2) to reciprocate the piston rod 140 into the fluid cylinder 136. This reciprocation of the piston rod 140 rotates the three-arm rocking beam 145 (FIGURE 2) in a counterclockwise direction as viewed in FIGURE 2 to rotate the mold operating shafts 112 and 95 in respective counterclockwise and clockwise directions in an obvious manner. This rotation of the mold operating shafts 112 and 95 causes movement of the various components of the mold holder actuating device 20 from the positions shown in FIGURE 3 to the positions shown in FIGURE 4 in an obvious manner, and a description of the opening of the mold holder 21 is therefore deemed unnecessary. It is, however, pointed out that the arms 30 and 31 of the mold holder 21 are limited in their pivoting about the mold holder shaft 25 toward a fully opened position by the adjustable stop mechanism 115 (FIGURE 4) in a manner heretofore described.

To insure vertical alignment of the halves or sections 35, 35 (FIGURE 1) of the mold 22, the mold holder arms 30 and 31 are adjusted axially relative to each other by the rings 40 and 41 shown in FIGURE 6 of the drawings. When the rings 40 and 41 are threaded upwardly as viewed in FIGURE 6, the mold holder arm 30 moves axially downwardly on the mold holder shaft 25. However, if the rings 40 and 41 are threaded downwardly as viewed in the same figure, the mold holder arm is urged axially upwardly. Thus, by suitably manipulating the threaded rings 40 and 41, the mold holder arms 30 and 31 can be axially adjusted with respect to each other to adjust the mold holder halves 35, 35 each carried by an associated end portion 32, 32 of the arms 30 and 31.

Figure 7:
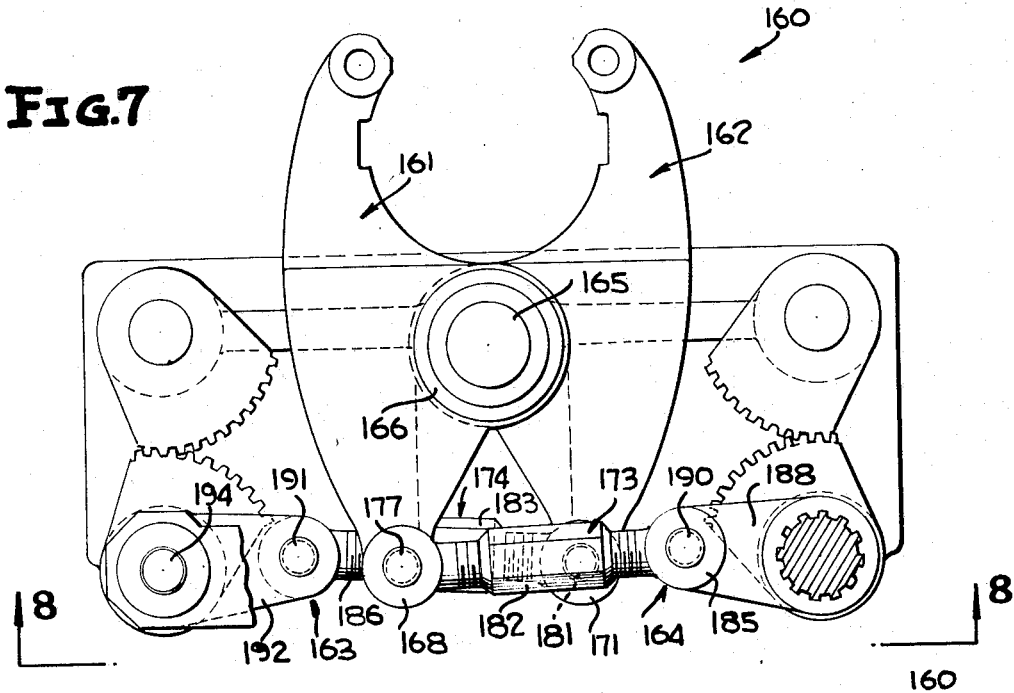
FIGURE 7 is a top plan view of another mold holder actuating mechanism constructed in accordance with this invention, with certain portions thereof broken away for clarity, and illustrates a pair of turnbuckles each forming a part of a pair of toggle linkage assemblies for preventing these toggle linkage assemblies from reaching a dead center position.
Figure 8:
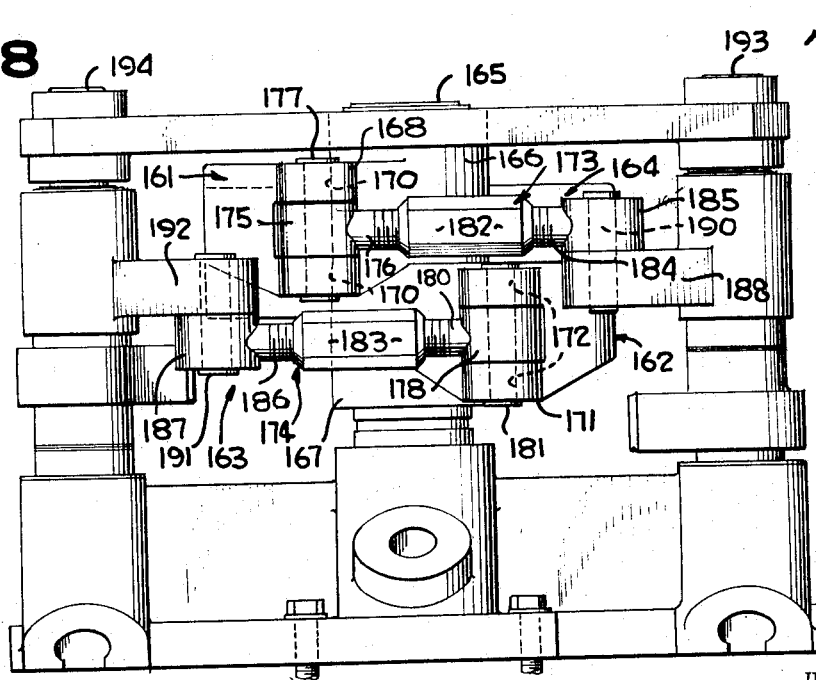
FIGURE 8 is a elevational view taken along line 8—8 of FIGURE 7, and more clearly illustrates the toggle linkage assemblies of the mold holder actuating mechanism.

Another mold holder actuating mechanism is shown in FIGURES 7 and 8 of the drawings, and is generally designated by the reference numeral 160. The mold holder actuating mechanism 160 is substantially identical to the mold holder actuating mechanism 20 of FIGURES 3 through 6 of the drawings and differs therefrom only in the configuration of a pair of mold holder arms 161 and 162 and a pair of toggle linkage assemblies 163, 164. Therefore, only those components of the mold holder actuating mechanism 160 which differ from the mold holder actuating mechanism 20 of FIGURES 3 through 6, such as the mold holder arms 161, 162 and the toggle linkage assemblies 163 and 164, will be described hereafter, it being again noted that the illustrated but non-described components of the mold holder actuating mechanism 160 are identical in structure and function to the comparable components in the mold holder actuating mechanism 20.

The mold holder actuating mechanism 160 comprises a mold holder shaft 165 upon which the mold holder arms 161 and 162 are pivotally journalled. The mold holder arm 161 is pivotally secured to the mold holder shaft 165 by a journal 166 while the mold holder arm 162 is similarly pivotally secured to the shaft 165 by a journal 167. An annular thrust washer (not shown but identical to any one of the thrust washers 51–53 of FIGURE 6) is positioned between the journals 166 and 167 of the arms 161 and 162 respectively. The journal 167 has an upwardly directed annular threaded portion (not shown) identical to the threaded portion 37 of FIGURE 6 and a threaded adjusting ring (such as the ring 40 of FIGURE 6 is secured thereto). Thus, the mold holder arms 161 and 162 can be axially adjusted in a manner substantially identical to that heretofore described in the consideration of FIGURE 6, the only difference being the mold holder actuating mechanism 160 merely requires a single threaded adjusting ring.

The arm 161 includes a bifurcated ear 168 having a pair of axially aligned vertical pin receiving openings 170, 170 (FIGURE 8). The arms 162 are similarly provided with a bifurcated ear 171 having a pair of vertically aligned pin receiving openings 172, 172.

Each of the toggle linkage assemblies 164 and 163 is identical and each includes a turnbuckle link assembly 173 and 174 respectively. An eye portion 175 of the turnbuckle link assembly 173 has a threaded stem 176, and is secured to the bifurcated end portion 168 of the arm 161 by a suitable pin 177. A similar eye portion 178 of the turnbuckle link assembly 174 has a threaded stem 180 and is pivotally secured to the bifurcated end portion 171 of the arm 162 by a suitable pivot pin 181. The threaded stem 176 of the eye portion 175 is threaded into a turnbuckle 182 of the turnbuckle link assembly 173 and an identical turnbuckle 183 is threadably secured to the threaded stem 180 of the eye portion 178. The turnbuckle 182 threadably receives another threaded stem 184 of an eye portion 185. Similarly, a threaded stem 186 of an eye portion 187 is received in the turnbuckle 183 of the turnbuckle link assembly 174. The eye portion 185 of the toggle link assembly 173 is secured to a crank arm or link 188 by a pin 190, and the eye portion 187 is similarly secured by a pin 191 to a crank arm or link 192. The crank arms or links 188 and 192 are respectively splined to shafts 193 and 194. The shafts 193 and 194 are identical in structure and function to the respective shafts 130 and 128 of FIGURE 5 of the drawings.

The mold holder actuating mechanism 160 of FIGURES 7 and 8 is adapted to be secured to a conventional glass forming machine in a manner identical to that described heretofore in the consideration of the mold holder actuating mechanism 20 of FIGURES 1, and 3 through 6 of the drawings. When the mold holder actuating mechanism 160 of FIGURES 7 and 8 is secured to a conventional glass molding machine, such as the glass molding machine 10 of FIGURE 1, the function of the mold holder actuating mechanism 160 is identical to that heretofore described in conjunction with the mechanism 20. For example, the reasons given for the exceptionally high "closing" force components and low "bending" force components of the mold holder actuating mechanism 20 are equally applicable to the mold holder actuating mechanism 160. For example, the toggle linkage assemblies 163 and 164 of the mold holder actuating mechanism 160 are positioned on the opposite side of the mold holder shaft 165 as compared to the end portions (unnumbered) of the arms 161 and 162 which apply closing forces to the mold sections. The toggle linkage assemblies 163 and 164 are also positioned so that the direction of the "bending" or "forward" components of force counteract each other, in the manner heretofore described in connection with FIGURES 1 and 3 of the drawings. This construction of the mold holder actuating mechanism 160 maintains any deflection of the mold holder shaft 165 to a minimum and avoids the disadvantages heretofore mentioned in conventional mold holder actuating mechanisms.

While an adjustable stop mechanism, similar to the mechanism 115 of FIGURES 3 and 4, has not been illustrated in FIGURES 7 and 8 of the drawings, it is to be understood that such a mechanism can be carried by the arm 162 for abutment against an edge of the arm 161 medially of the axes of the mold holder shaft 165 and the pin 177 to prevent opening of the arms 161 and 162 beyond a preselected position.

The toggle linkage assemblies 163 and 164 allow take-up for initial set-up, wear and manufacturing tolerances by merely rotating the turnbuckles 182 and 183 of the respective turnbuckle link assemblies 173 and 174. The turnbuckle link assemblies 173 and 174 also prevent the respective toggle linkage assemblies 164 and 163 from reaching a "dead center" position and permit an optimum toggle angle in these toggle linkage assemblies.

From the foregoing, it will be seen that novel and advantageous mold holder and actuating mechanism have been disclosed herein for obtaining the desired end and eliminating disadvantages inherent in conventional mold holder actuating mechanisms. However, attention is directed to the fact that this description is merely illustrative of the preferred embodiments of this invention, the invention being defined in the appended claims.

We claim:

1. A mold actuating mechanism comprising a pair of mold holder arms each pivotally journalled to a common shaft, said mold holder arms including means for securing mold sections thereto, first positioning means carried by a first of said pair of mold holder arms, second positioning means carried by a second of said pair of mold holder arms opposing said first means, said first and second positioning means being disposed between said mold holder arms, and said first and second positioning means being movable relative to each other for relatively axially adjusting said pair of mold holder arms along the common shaft in directions parallel thereto.

2. The mold actuating mechanism as defined in claim 1 wherein at least one of said first and second positioning means includes a ring carried by a first of said pair of mold holder arms, and means for axially adjusting said ring with respect to said first mold holder arm for movement of said ring toward and away from said second mold holder arm.

3. In a mold actuating mechanism of the type including a pair of mold holder arms each pivotally journalled to a common shaft, said mold holder arms including means for securing mold sections thereto, the improvement comprising first and second axially spaced journals journalling a first of said pair of mold holder arms to said shaft, a third journal journalling a second of said pair of mold holder arms to said shaft between said first and second journals, and means between said third journal and each of said first and second journals for axially adjusting said pair of mold holder arms relative to each other.

4. The improvement in a mold actuating mechanism of the type defined in claim 3 wherein each of said means comprise an adjusting ring surrounding said shaft and threadably connected to an annular threaded end portion of said third journal.

5. The improvement in a mold actuating mechanism of the type defined in claim 4 wherein an annular washer is interposed between each of said adjusting rings and an associated one of said first and second journals of said first mold holder arm.

6. A mold actuating mechanism comprising a pair of mold holders each pivotally journalled to a common shaft, each of said mold holders being a first class lever with the common shaft being a fulcrum, a mold gripping end portion of each mold holder being arranged at one side of said fulcrum and a connector end portion of each mold holder being arranged at a second side of said fulcrum, a pair of toggle linkage assemblies, each toggle linkage assembly being connected to one of a pair of shafts, said pair of shafts and said common shaft being in substantially parallel relationship to each other, at least a pair of toggle links in each toggle linkage assembly, pivot means connecting a first link of said pair of links to an associated one of said pair of mold holders at the connector end portions thereof, means connecting a second link of said pair of links with an associated one of said last-mentioned shafts, means for articulately interconnecting the first and second links of each pair of toggle links, and the axes of said pivot means and said articulately interconnecting means being disposed in generally linear relationship in the closed position of said mold holder and to said second side of the fulcrum in both the open and closed positions of the mold holders.

7. The mold actuating mechanism as defined in claim 6 wherein said articulately interconnecting means interconnecting the first and second links of each pair of toggle links is an eccentric journalling pin.

8. The mold actuating mechanism as defined in claim 6 wherein means are carried by each of said last-mentioned shafts for imparting movement to said pair of mold holders through said pair of toggle linkage assemblies, and said movement imparting means is a crank arm having a plurality of arcuately arranged teeth for engagement by a similar crank arm adapted for connection to a mold operating shaft of a conventional glass forming machine.

9. The mold actuating mechanism as defined in claim 8 including means for stopping the pivotal movement of the pair of mold holders at a fully opened position thereof, and means for adjusting the stop means to vary the open position of the pair of mold holders.

10. The mold actuating mechanism as defined in claim 8 including first means carried by a first of said mold holders, second means carried by a second of said pair of mold holders opposing said first means, and said first and second means being cooperable for relatively axially adjusting said pair of mold holders.

11. A mold actuating mechanism comprising a base, a pair of mold holders each pivotally journalled to a common shaft projecting outwardly of said base, each of said holders being a first class lever with the common shaft being a fulcrum, a mold gripping end portion of each mold holder being arranged at one side of said fulcrum and a connector end portion of each mold holder being arranged at a second side of said fulcrum, a pair of toggle linkage assemblies, each toggle linkage assembly including a shaft projecting outwardly from said base, a pair of toggle links in each toggle linkage assembly, pivot means connecting a first link of said pair of links to an associated one of said pair of mold holders at the connector end portions thereof, means connecting a second link of said pair of links with an associated one of said last-mentioned shafts of each of said pair of toggle linkage assemblies, second pivot means for interconnecting the first and second links of each of said pair of toggle links, and the axes of said first and second pivot means and said connecting means being disposed in generally linear relationship in the closed position of said mold holder and to said second side of the fulcrum in both the open and closed positions of the mold holders.

12. The mold actuating mechanism as defined in claim 11 including means for adjusting the first and second links of each of the pair of toggle links relative to each other, and said adjusting means is an eccentric pin journalled between the first and second links of each pair of toggle links.

13. The mold actuating mechanism as defined in claim 11 wherein means are provided for adjusting the first and second links of each of the pair of toggle links relative to each other, and said adjusting means is a turnbuckle mechanism associated with the first and second links of each pair of toggle links.

14. The mold actuating mechanism as defined in claim 11 wherein means are carried by each of said last mentioned shafts for imparting movement to said pair of mold holders through said pair of toggle linkage assemblies, and said movement imparting means is a crank arm having a plurality of arcuately arranged teeth for engagement by a similar crank arm adapted for connection to a mold operating shaft of a conventional glass forming machine.

15. The mold actuating mechanism as defined in claim 13 wherein means are carried by each of said last-mentioned shafts for imparting movement to said pair of mold holders through said pair of toggle linkage assemblies, and said movement imparting means is a crank arm having a plurality of arcuately arranged teeth for engagement by a similar crank arm adapted for connection to a mold operating shaft of the conventional glass forming machine.

References Cited

UNITED STATES PATENTS

| | | | |
|---|---|---|---|
| 1,398,670 | 11/1921 | Bridges | 65—323 X |
| 1,856,518 | 5/1932 | Soubier | 65—360 X |
| 2,744,358 | 5/1956 | Rowe | 65—360 X |
| 2,949,701 | 8/1960 | Olson et al. | 65—323 X |

DONALL H. SYLVESTER, *Primary Examiner.*

A. D. KELLOGG, *Assistant Examiner.*